United States Patent
Drewry et al.

(10) Patent No.: US 9,503,764 B1
(45) Date of Patent: *Nov. 22, 2016

(54) PROCESSING AND/OR DISTRIBUTING MEDIA CONTENT ASSOCIATED WITH AT LEAST ONE PARAMETER RELATED TO A MEMORY OPERATION

(71) Applicant: Google Inc., Mountain View, CA (US)

(72) Inventors: William Alexander Drewry, Nashville, TN (US); David Kimbal Dorwin, Kirkland, WA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,208

(22) Filed: Sep. 17, 2015

Related U.S. Application Data

(63) Continuation of application No. 14/145,409, filed on Dec. 31, 2013, now Pat. No. 9,167,207.

(51) Int. Cl.
| | |
|---|---|
| H04L 29/06 | (2006.01) |
| H04N 21/2347 | (2011.01) |
| H04L 9/08 | (2006.01) |
| H04N 21/266 | (2011.01) |
| H04N 21/4627 | (2011.01) |
| H04N 21/4405 | (2011.01) |

(52) U.S. Cl.
CPC ............ *H04N 21/2347* (2013.01); *H04L 9/08* (2013.01); *H04N 21/26613* (2013.01); *H04N 21/4405* (2013.01); *H04N 21/4627* (2013.01)

(58) Field of Classification Search
CPC ......... H04L 9/08; H04L 9/0861; H04L 9/14; H04L 9/0825; H04L 9/0816; H04L 9/0819; H04L 9/0822; H04N 7/1675; H04N 21/2347; H04N 21/26613; H04N 21/4405; H04N 21/4627

USPC ......................................................... 380/205
See application file for complete search history.

(56) References Cited

U.S. PATENT DOCUMENTS

| | | | | |
|---|---|---|---|---|
| 2003/0231334 A1* | 12/2003 | Nagai | ............. | G11B 20/00086 358/1.14 |
| 2008/0256645 A1* | 10/2008 | Choi | ...................... | G06F 21/10 726/27 |
| 2009/0086975 A1* | 4/2009 | Robert | ............. | G11B 20/00086 380/277 |
| 2009/0190753 A1* | 7/2009 | Watanabe | ........ | G11B 20/00086 380/44 |

OTHER PUBLICATIONS

Percival, C., "Stronger Key Derivation via Sequential Memory-Hard Functions," 2009, 16 pages.
Office Action for U.S. Appl. No. 14/145,409, dated Mar. 12, 2015, 34 pages.
Notice of Allowance for U.S. Appl. No. 14/145,409, dated Jul. 7, 2015, 42 pages.

* cited by examiner

*Primary Examiner* — Yogesh Paliwal
(74) *Attorney, Agent, or Firm* — Fenwick & West LLP

(57) ABSTRACT

A system to facilitate media content protection is provided. The system includes a partitioning component, a key derivation component and an output component. The partitioning component partitions encrypted media content associated with a master key into a plurality of media content segments. The key derivation component generates respective subkeys for the plurality of media content segments based at least in part on the master key and one or more parameters associated with one or more memory operations. The output component generates decrypted media content based at least in part on the respective subkeys.

17 Claims, 14 Drawing Sheets

PROCESSING AND/OR DISTRIBUTING MEDIA CONTENT ASSOCIATED WITH AT LEAST ONE PARAMETER RELATED TO A MEMORY OPERATION

CROSS-REFERENCE TO RELATED APPLICATIONS

This application is a continuation of U.S. patent application Ser. No. 14/145,409, filed Dec. 31, 2013, and entitled, "PROCESSING AND/OR DISTRIBUTING MEDIA CONTENT ASSOCIATED WITH AT LEAST ONE PARAMETER RELATED TO A MEMORY OPERATION," the entirety of which is incorporated herein by reference.

TECHNICAL FIELD

This disclosure relates to system(s) and method(s) for processing and/or distributing media content associated with at least one parameter related to a memory operation.

BACKGROUND

The Internet and media enabled portable computing devices have dramatically altered the processes for generating and consuming media content. Presently, users can consume media content virtually anywhere at any time, as long as they have access to a media capable device with an Internet connection. The convenience of being able to view media content via the Internet, essentially on demand, has resulted in explosive growth of Internet media consumption. Internet media traffic is currently approaching a majority of consumer Internet traffic, and the rate of demand is projected to continue increasing.

The explosive growth of Internet media traffic is at least partially attributable to the inherent portability of digital media content, and simplicity of accurate reproduction. However, these characteristics also make protecting the rights of digital media content owners challenging. Millions of people around the world have the capability to consume and produce digital media content, and popular online services can receive tens (if not hundreds) of hours worth of newly uploaded content every minute.

A technique that been commonly employed by online services to protect media content is requiring consumers to employ a content protection or digital rights management solution that controls consumption and/or usage of media content. However, conventional content protection and/or digital rights management solutions can be improved. For example, media content controlled by conventional content protection and/or digital rights management solutions is still susceptible to being copied by an analog technique (e.g., via an analog to digital recording device).

SUMMARY

The following presents a simplified summary of the specification in order to provide a basic understanding of some aspects of the specification. This summary is not an extensive overview of the specification. It is intended to neither identify key or critical elements of the specification, nor delineate any scope of the particular implementations of the specification or any scope of the claims. Its sole purpose is to present some concepts of the specification in a simplified form as a prelude to the more detailed description that is presented later.

In accordance with an implementation, a system includes a partitioning component, a key derivation component and an output component. The partitioning component partitions encrypted media content associated with a master key into a plurality of media content segments. The key derivation component generates respective subkeys for the plurality of media content segments based at least in part on the master key and one or more parameters associated with one or more memory operations. The output component generates decrypted media content based at least in part on the respective subkeys.

In accordance with another implementation, a method provides for partitioning encrypted media content associated with a master key into a plurality of media content segments, generating respective subkeys for the plurality of media content segments based at least in part on the master key and one or more parameters associated with one or more memory operations, and generating decrypted media content based at least in part on the respective subkeys.

In accordance with yet another implementation, a method provides for receiving one or more values associated with content protection for media content, generating one or more parameters associated with one or more memory operations based on the one or more values associated with the content protection for the media content, and generating encrypted media content that includes the one or more parameters associated with the one or more memory operations.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, implementations, objects and advantages of the present invention will be apparent upon consideration of the following detailed description, taken in conjunction with the accompanying drawings, in which like reference characters refer to like parts throughout, and in which.

DETAILED DESCRIPTION

Figure 1:
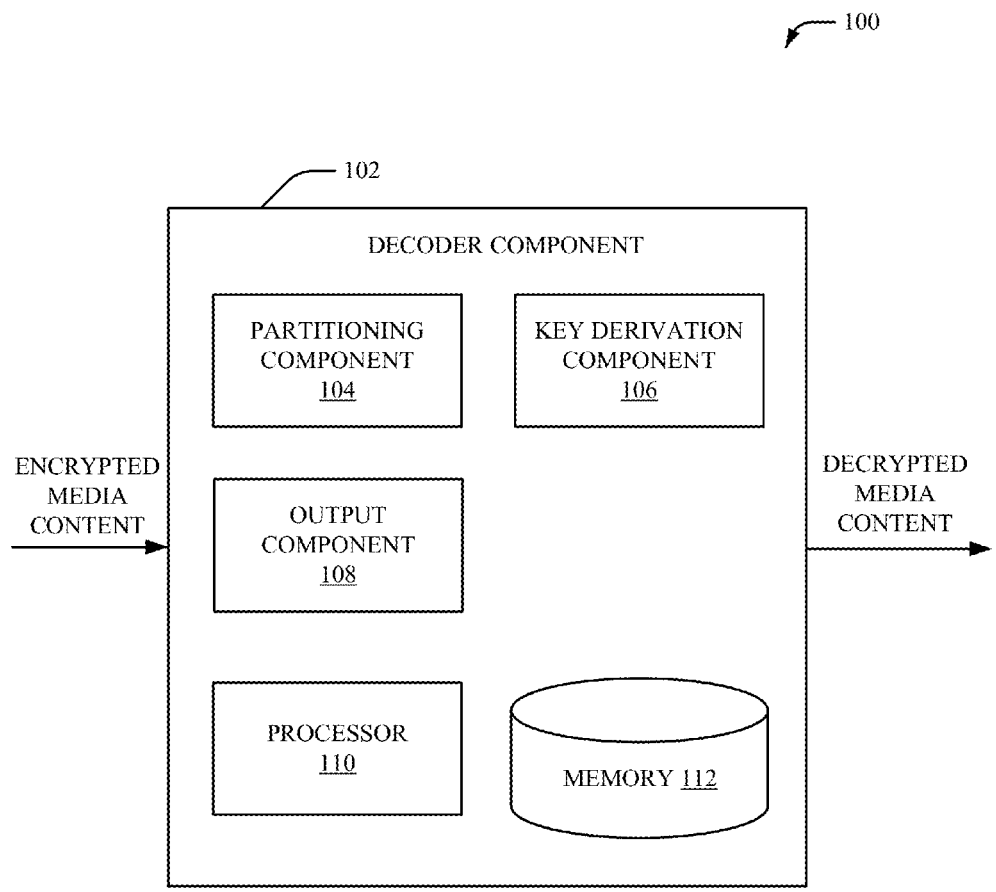
FIG. 1 illustrates a high-level block diagram of an example system for decrypting media content, in accordance with various aspects and implementations described herein.

Various aspects of this disclosure are now described with reference to the drawings, wherein like reference numerals are used to refer to like elements throughout. In the following description, for purposes of explanation, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

Online services often require consumers to employ a content protection or digital rights management (DRM) solution in order to control consumption and/or usage of media content. In one example, a client device can include one or more DRM solutions which can be available, for example, to a browser (or other client software) of the client device. The DRM solutions can be, for example, pre-installed with an operating system of the client device, installed as part of the browser (or other client software), or otherwise obtained. However, conventional content protection and/or digital rights management solutions can be improved. For example, media content controlled by conventional content protection and/or digital rights management solutions is still susceptible to being copied by an analog technique (e.g., via an analog to digital recording device).

To that end, techniques for processing and/or distributing media content associated with at least one parameter related to a memory operation are disclosed. For example, encrypted media content can be associated with at least one parameter related to a memory operation (e.g., an operation associated with one or more memories on a media playback device). The at least one parameter related to the memory operation can then be employed when processing the encrypted media content (e.g., when deriving one or more content keys associated with the encrypted media content, when decoding the encrypted media content, etc.). In an aspect, at least one parameter related to a memory operation can be employed in connection with a key derivation function to increase cost of generating a copy of media content (e.g., an unauthorized copy of media content) by utilizing an increased portion of memory when processing (e.g., decoding) the media content. As such, a computational expense can be added to a decryption process associated with media content (e.g., streaming media content) to minimize unauthorized copies of the media content and/or unauthorized consumption of media content. Accordingly, improved media content protection for media content can be provided.

In an aspect, a content provider can determine how quickly to allow media content to be accessed by a content consumer (e.g., a content provider can determine time-to-duplicate media content). For example, a computational expense for processing a least a portion of media content (e.g., encrypted media content) can correlate to a time-to-duplicate (e.g., a time-to-derive) media content. A least amount of time-to-duplicate can correspond to a computation time associated with network overhead to copy media content (e.g., encrypted media content). A most amount of time-to-duplicate can correspond to a computation time for media content (e.g., encrypted media content) to playback fully (e.g., since audio content and/or video content will be fully consumable via an analog recording device). Therefore, a risk profile (e.g., a numeric risk profile) associated with content protection for media content can be provided based on a time-to-duplicate value. For example, a risk profile (e.g., a numeric risk profile) can correspond to a risk tolerance level associated with strength (e.g., quality) of content protection (e.g., a risk profile can correspond to risk of media content being copied). In one example, risk tolerance associated with media content can be converted to a risk value that is scaled against total playback time of media content (e.g., encrypted media content). Accordingly, a technique to allow a content provider to limit risk of media content being copied by an unauthorized consumer can be provided.

Referring initially to FIG. 1, there is illustrated an example system 100 for decrypting media content, according to an aspect of the subject disclosure. In an aspect, the system 100 can be implemented on or in connection with a device (e.g., a user device). For example, the device (e.g., the user device) can include, but is not limited to, a cellular phone (e.g., a smart phone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc. In another aspect, the system 100 can be implemented on or in connection with one or more servers (e.g., one or more servers that host user-uploaded media content). For example, the system 100 can be employed by various systems, such as, but not limited to media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, and the like. In yet another aspect, the system 100 can be implemented in connection with a web browser. In yet another aspect, the system 100 can be implemented in connection with a HyperText Markup Language (HTML), e.g., HTML5.

Specifically, the system 100 can provide a decoder component with a partitioning feature (e.g., partitioning component 104), a key derivation feature (e.g., key derivation component 106) and an output feature (e.g., output component 108) that can be utilized in, for example, a media content application (e.g., a video application). The partitioning feature can partition encrypted media content associated with a master key into a plurality of media content segments. The key derivation feature can generate respective subkeys for the plurality of media content segments based at least in part on the master key and one or more parameters associated with one or more memory operations. The output feature can generate decrypted media content based at least in part on the respective subkeys.

In particular, the system 100 can include a decoder component 102 that includes at least a partitioning component 104, a key derivation component 106 and an output component 108. Aspects of the systems, apparatuses or processes explained in this disclosure can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 100 can include memory 112 for storing computer executable components and instructions. System 100 can further include a processor 110 to facilitate operation of the instructions (e.g., computer executable components and instructions) by system 100.

The decoder component 102 (e.g., the partitioning component 104) can receive encrypted media content (e.g., ENCRYPTED MEDIA CONTENT shown in FIG. 1). The encrypted media content (e.g., an encrypted media file) can include, but is not limited to, an encrypted video (e.g., an encrypted video file, an encrypted video clip, an encrypted video sample, etc.), an encrypted image (e.g., an encrypted image file, an encrypted picture, an encrypted thumbnail, etc.), encrypted music (e.g., an encrypted audio file, an encrypted audio clip, an encrypted audio sample, etc.), an encrypted electronic book (e-book), an encrypted video game and/or encrypted user-generated content. In an aspect, the encrypted media content can be encrypted streaming media content. It is to be appreciated that the encrypted media content can be in any recognizable and suitable media file format (e.g., video file format, image file format and/or audio file format), codec compression format, etc. In one example, the encrypted media content can be media content uploaded by a user (e.g., a user of a media sharing platform). For example, a user (e.g., a content provider) can upload media content via a smart phone, a cell phone, a tablet, a laptop, a desktop computer, a personal digital assistant (PDA), a portable music player, a video game system, an electronic reader (e-reader), global positioning system (GPS), a set-top box, a television, etc.

In an aspect, the encrypted media content can be associated with a master key (e.g., a title key, a content key, a license key, etc.). For example, the master key can be a key (e.g., a decryption key) for decrypting at least a portion of the encrypted media content. In an aspect, the master key can be provided before the encrypted media content is received by the decoder component 102 (e.g., the partitioning component 104). For example, the decoder component 102 can store (e.g., previously store) a master key to decrypt particular encrypted media content, for example, in memory/storage (e.g., memory 112, a different memory, etc.). In one example, the master key can be received from a server(s) associated with a license/key provider. In another example, the partitioning component 104 can request a master key from a server or a data store. In another aspect, the master key can be provided along with the encrypted media content.

For example, the master key can be embedded in the media content with timed metadata (e.g., an offset value).

The partitioning component 104 can partition the encrypted media content associated with the master key into a plurality of media content segments. For example, the plurality of media content segments can include a plurality of video content segments and/or a plurality of audio content segments. In an aspect, the partitioning component 104 can partition the encrypted media content associated with the master key into a plurality of media content segments based on a particular interval of time. In one example, the partitioning component 104 can determine the particular interval of time based on length of the encrypted media content (e.g., content length). In a non-limiting example, the partitioning component 104 can partition the encrypted media content associated with the master key into a plurality of 30 second media content segments. However, it is to be appreciated that the partitioning component 104 can partition the encrypted media content associated with the master key into a plurality of media content segments based on a different interval of time. In another aspect, the partitioning component 104 can partition the encrypted media content associated with the master key into a plurality of media content segments based on a characteristic associated with the encrypted media content (e.g., number of media frames, format of the encrypted media content, codec compression format, etc.). However, it is to be appreciated that the partitioning component 104 can partition the encrypted media content associated with the master key into a plurality of media content segments based on different criteria.

The key derivation component 106 can process the encrypted media content (e.g., the plurality of content segments) based at least in part on the master key and one or more parameters associated with one or more memory operations (e.g., one or more memory operations associated with at least one memory implemented on a media playback device). In an aspect, the key derivation component 106 can generate respective subkeys for the plurality of media content segments based at least in part on the master key and one or more parameters associated with one or more memory operations. For example, the key derivation component 106 can generate a first subkey for a first media content segment based at least in part on the master key and one or more parameters associated with one or more memory operations, generate a second subkey for a second media content segment based at least in part on the master key and one or more parameters associated with one or more memory operations, etc. In an aspect, the one or more memory operations can be one or more random-access memory (RAM) operations. However, it is to be appreciated that the one or more memory operations can be an operation associated with a different type of memory.

In an aspect, all of the respective subkeys for the plurality of media content segments can be generated based at least in part on one or more parameters associated with one or more memory operations. For example, every respective subkey for the plurality of video content segments and/or the plurality of audio content segments can be generated based at least in part on one or more parameters associated with one or more memory operations. In another aspect, respective subkeys for a subset of the plurality of media content segments can be generated based at least in part on one or more parameters associated with one or more memory operations. For example, respective subkeys for a subset of the plurality of media content segments can be generated without employing a parameter associated with a more memory operation. As such, in an aspect, only a portion of the respective subkeys for the plurality of media content segments is generated based at least in part on one or more parameters associated with one or more memory operations. In one example, respective subkeys for a subset of the plurality of video content segments and/or a subset of the plurality of audio content segments can be generated based at least in part on one or more parameters associated with one or more memory operations. It is to be appreciated that the key derivation component 106 can generate a subkey for each media content segment from the plurality of media content segments based on a unique set of parameters associated with one or more memory operations (e.g., a subkey of a particular media content segment can be generated based on a particular set of parameters associated with one or more memory operations, a subkey for a different media content segment can be generated based on a different set of parameters associated with one or more memory operations, etc.).

The one or more parameters associated with one or more memory operations can be one or more memory-hard algorithm parameters (e.g., one or more parameters associated with a memory-hard key derivation algorithm). A memory operation can include an active memory operation (e.g., a read, a write, etc.). For example, a memory operation can include an active memory operation associated with a memory-hard key derivation algorithm. In an aspect, the one or more parameters associated with one or more memory operations can be associated with a hash operation. The one or more parameters associated with one or more memory operations can include, but is not limited to, an amount of memory to utilize (e.g., a percentage of a memory capacity to utilize), number of steps to perform (e.g., number of steps associated with a memory-hard algorithm to perform) and/or a different type of parameter associated with a memory-hard algorithm and/or a memory (e.g., a memory of a media playback device).

In an aspect, the one or more parameters associated with one or more memory operations can be generated based on, but not limited to, a total playback time of the encrypted media content, a total time (e.g., a computation time) associated with generating a copy of at least a portion of the encrypted media content (e.g., a time-to-derive value) and/or a risk value associated with content protection (e.g., a risk value corresponding to risk of media content being copied by an unauthorized consumer). For example, values for the one or more parameters associated with one or more memory operations can correspond to a specific risk level (e.g., 20% risk, 45% risk, 90% risk, etc.) corresponding to risk of media content being copied by an unauthorized consumer. In one example, a time-to-derive value=(1-risk level value)*(content length value). In a non-limiting example, if a portion of protected content is 10 seconds in length and time-to-derive is 9 seconds, then risk level value is 0.1. As such, encrypted media content can be configured so that n seconds of computational time is required (e.g., required to obtain decrypted media content) for every m seconds of encrypted media content. Accordingly, memory-hard algorithms can be constrained by memory subsystem performance of a computing device rather than a processor of the computing device.

In an aspect, the key derivation component 106 can generate the respective subkeys for the plurality of media content segments based at least in part on timed metadata (e.g., an offset value). For example, the master key can be paired with timed metadata (e.g., the master key can be embedded in the media content with timed metadata). As such, the key derivation component 106 can further generate respective subkeys for the plurality of media content segments based at least in part on timed metatdata (e.g., the key derivation component 106 can generate respective subkeys for the plurality of media content segments based at least in part on the master key, timed metadata and one or more parameters associated with one or more memory operations).

In an embodiment, the key derivation component 106 can generate a subkey for a media content segment based on data included in a previous media content segment. For example, the key derivation component 106 can generate a subkey for a particular media content segment from the plurality of media content segments based on data associated with a previous media content segment from the plurality of media content segments. In another embodiment, the key derivation component 106 can generate a subkey for a media content segment based on a previously generated subkey (e.g., a subkey generated for a previous media content segment). As such, the respective subkeys for the plurality of media content segments generated by the key derivation component 106 can be chained (e.g., linked) together. Therefore, the key derivation component 106 can generate respective subkeys for the plurality of media content segments based at least in part on sequential memory-hard operations.

The output component 108 can generate decrypted media content (e.g., DECRTYPED MEDIA CONTENT shown in FIG. 1) based at least in part on the respective subkeys. For example, the output component 108 can generate a decrypted media steam based at least in part on the respective subkeys. As such, decrypted media content can be generated as a function of one or more parameters associated with one or more memory operations. In an aspect, the output component 108 can generate the decrypted media content based at least in part on key cryptography. For example, the output component 108 can generate the decrypted media content based at least in part on symmetric key decryption (e.g., a symmetric cryptographic operation). As such, the output component 108 can employ more than one type of decryption operation to generate decrypted media content. In another aspect, the decrypted media content is further processed based at least in part on a different type of symmetric key decryption (e.g., a different symmetric cryptographic operation). In yet another aspect, the output component 108 can generate the decrypted media content based at least in part on memory-bounded decryption (e.g., a memory-bounded key decryption operation). However, it is to be appreciated that a different type of decryption technique can be employed to can generate decrypted media content based at least in part on the respective subkeys.

While FIG. 1 depicts separate components in system 100, it is to be appreciated that the components may be implemented in a common component. For example, the partitioning component 104, the key derivation component 106 and/or the output component 108 can be included in a single component. Further, it can be appreciated that the design of system 100 can include other component selections, component placements, etc., to facilitate decryption of media content.

Figure 2:
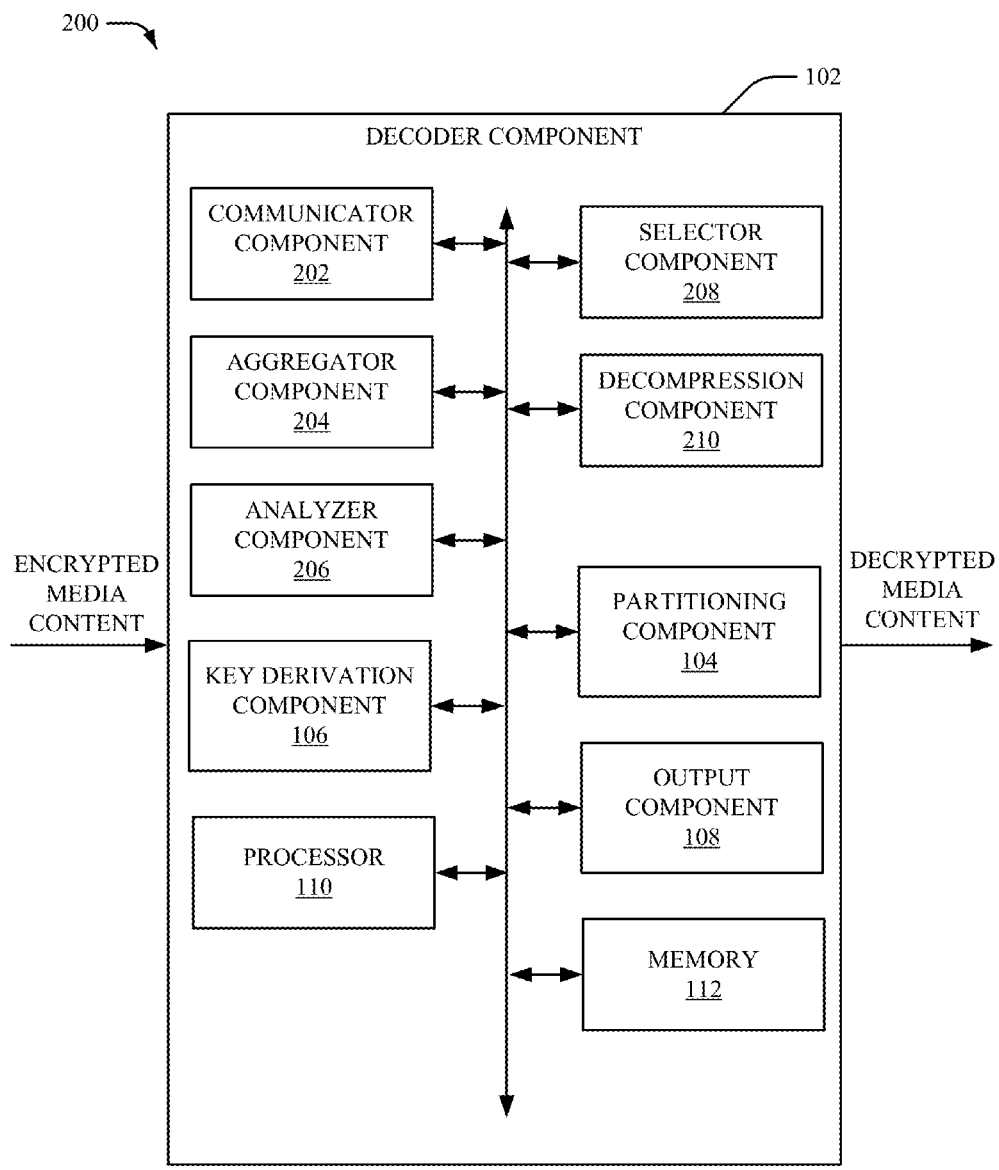
FIG. 2 illustrates a high-level block diagram of another example system for decrypting media content, in accordance with various aspects and implementations described herein.

Referring now to FIG. 2, there is illustrated a non-limiting implementation of a system 200 in accordance with various aspects and implementations of this disclosure. The system 200 includes the decoder component 102. The decoder component 102 can include the partitioning component 104, the key derivation component 106, the output component 108, a communicator component 202, an aggregator component 204, an analyzer component 206, a selector component 208 and/or a decompression component 210.

The communicator component 202 can communicate (e.g., transmit, receive, etc.) information between the decoder component 102 and other components (e.g., one or more servers, an encoder component, a display, a user interface, a media source, a data store, a computer-readable storage media, etc.). The information can include, for example, received encoded video frames of a video frame sequence (e.g., encrypted media content), information that can facilitate decoding encoded content, one or more residual blocks, one or more rotational angles, one or more rotational indices, motion vectors, information corresponding to predictor blocks, a coding mode associated with an encoded block of a video frame, information relating to defined decoding criterion or corresponding rules, information relating to decoding parameters, decoding algorithms, decoded content presented for display, etc. The decoder component 102 can use the information to facilitate enabling the decoder component 102 to decode encoded content (e.g., the encrypted media content). The communicator component 202 also can transmit decoded video frames (e.g., decrypted media content) to, for example, a display (e.g., a display of a media capable device).

The aggregator component 204 can aggregate data received (e.g., obtained) from various entities (e.g., processor, data store, an encoder component, a user interface, one or more servers, etc.). The aggregator component 204 can correlate respective items of data based at least in part on type of data, source of the data, time or date the data was generated or received, encoding state of the data, a video frame to which the data relates, etc., to facilitate analyzing the data.

The analyzer component 206 can analyze data relating to decoding data, ordering of prior decoded blocks of current and/or previous video frames in relation to decoding a current block, identifying a coding mode, etc., and can generate analysis results, based at least in part on the data analysis. For example, the analyzer component 206 can analyze prior decoded blocks (and associated prior decoded motion vectors) of current and previous video frames to facilitate ordering these prior decoded blocks (and associated prior decoded motion vectors) in accordance with defined decoding criterion. The decoder component 102 can use the analysis results to facilitate enabling the decoder component 102 to efficiently decode encoded video frames of a video frame sequence (e.g., encrypted media content).

The selector component 208 can select items of data, an applicable decoding-related algorithm (e.g., symmetric key decryption algorithm, memory-bounded decryption algorithm, memory-hard decryption algorithm, decompression algorithm, prior-decoded-motion-vector ordering algorithm, algorithm relating to identifying a coding mode, etc.), a block (e.g., current block, prior decoded block, etc.) of a video frame, a coding mode, or other information, to facilitate decoding data of an encoded video frame. For example, the selector component 208 can select one or more parameters, one or more items of data, etc., relevant to a decoding task (e.g., ordering of prior decoded motion vectors, identifying a coding mode, etc.) being performed by the decoder component 102.

The decompression component 210 can decode or decompress data associated with an encoded video frame in accordance with a defined decoding or decompression algorithm. In some implementations, the decompression component 210 can use a specified quantization value that can correspond to the decompression level to be used during the decoding of an encoded block of a video frame.

In some implementations, the processor 110 that can operate with the other components (e.g., communicator component 202, aggregator component 204, analyzer component 206, selector component 208, decompression component 210, partitioning component 104, key derivation component 106, output component 108, etc.) to facilitate performing the various functions of the decoder component 102, as more fully disclosed herein. In an aspect, the processor 110 can employ one or more processors, microprocessors, or controllers that can process data, such as information relating to decoding data, information relating to other operations of the decoder component 102, and/or other information, etc., to facilitate decoding encoded video content and/or performing other operations associated with the decoder component 102, as more fully disclosed herein. In another aspect, the processor 110 also can control data flow between the decoder component 102 and other components (e.g., one or more servers, a data store, computer-readable storage media, a display component, etc.) associated with the decoder component 102.

In some implementations, the memory 112 can store data structures (e.g., user data, metadata), instructions, procedures, and/or code structure(s) (e.g., modules, objects, hashes, classes) to facilitate performing or controlling operations associated with the decoder component 102. In an aspect, the memory 112 also can store information (e.g., decoding-related algorithms, coding modes, decoding parameters, decoding criterion, etc.) relating to decoding data and other information relating to other operations of the decoder component 102, to facilitate decoding video content, and performing or controlling operations, associated with the decoder component 102. The processor 110 can be coupled (e.g., through a memory bus) to the memory 112 in order to store and retrieve information desired to operate and/or confer functionality, at least in part, to the components (e.g., communicator component 202, aggregator component 204, analyzer component 206, selector component 208, decompression component 210, partitioning component 104, key derivation component 106, output component 108, etc.) of the decoder component 102, and/or substantially any other operational aspects of the decoder component 102.

Figure 3:
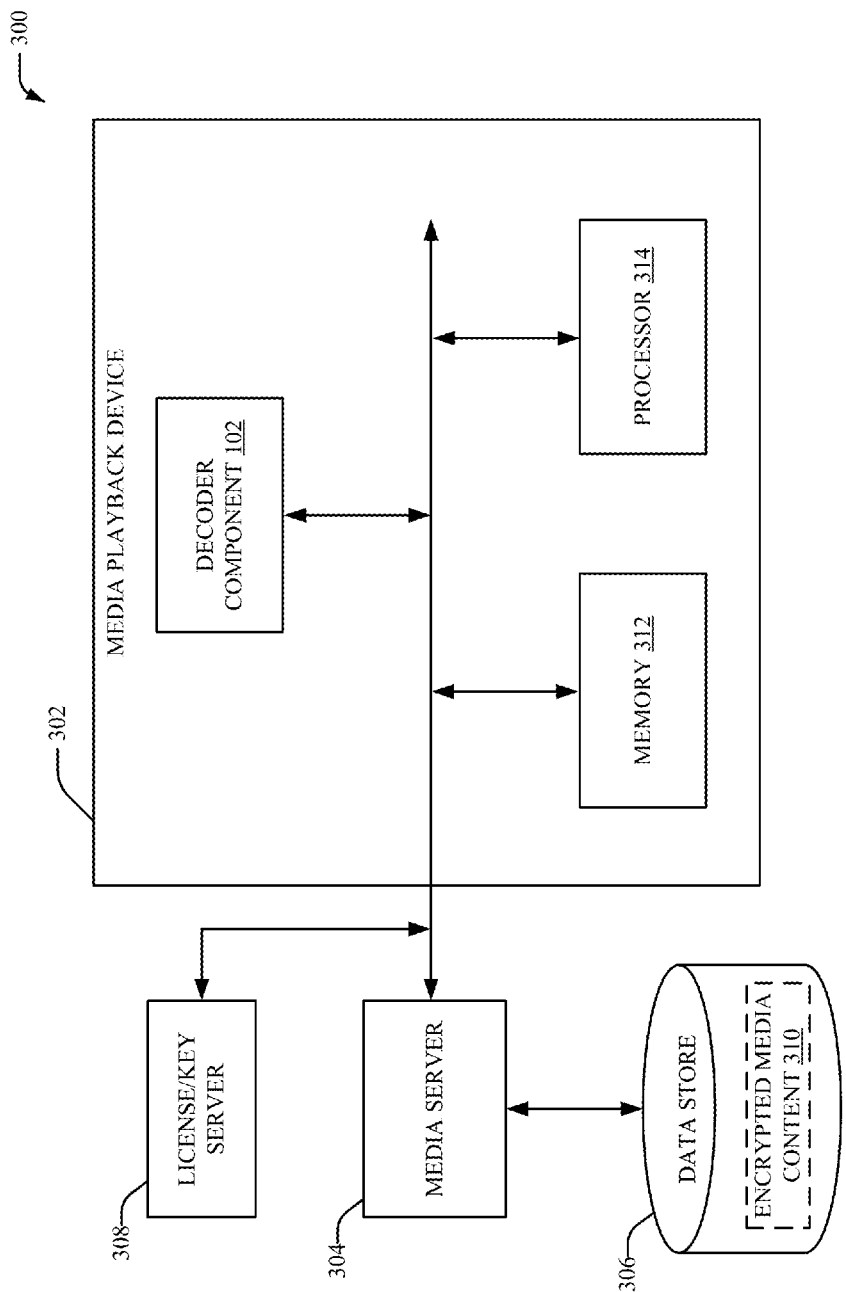
FIG. 3 illustrates a high-level block diagram of an example system to facilitate media content protection, in accordance with various aspects and implementations described herein.

FIG. 3 illustrates a non-limiting implementation of a system 300 in accordance with various aspects and implementations of this disclosure. The system 300 includes a media playback device 302, a media server 304, a data store 306 and a license/key server 308. It is to be appreciated that the media server 304 can include one or more media servers, the data store 306 can include one or more data stores, and the license/key server 308 can include one or more license/key servers. The media playback device 302 (e.g., client device, user device, consumer device, etc.) can include, but is not limited to, a cellular phone (e.g., a smart phone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc.

The media playback device 302 can be associated with a content consumer (e.g., a licensed viewer of encrypted media content). In an aspect, the media playback device 302 can be associated with a web browser. The media playback device 302 can include at least the decoder component 102 (e.g., partitioning component 104, key derivation component 106, output component 108, communicator component 202, aggregator component 204, analyzer component 206, selector component 208 and/or decompression component 210), a memory 312 and/or a processor 314. The memory 312 can include one or more memories. In an aspect, the memory 312 can be implemented as RAM. However, it is to be appreciated that the memory 312 can be implemented as a different type of volatile memory and/or a different type of non-volatile memory. In another aspect, the memory 312 can be implemented as a memory subsystem. Additionally, the processor 314 can be implemented as one or more processors. The media playback device 302 can be configured to facilitate playback of media content (e.g., encrypted media content). In an aspect, the one or more parameters and/or the one or more memory operations utilized by the key derivation component 106 can be associated with the memory 312 of the media playback device 302. For example, a memory operation can include an active memory operation (e.g., a read, a write, etc.) associated with the memory 312 of the media playback device 302. In one example, one or more memory-hard algorithms associated with the key derivation component 106 can employ bus bandwidth restrictions associated with the memory 312. As such, memory-hard algorithms associated with the memory 312 can be constrained by performance of the memory 312 of the media playback device 302 rather than the processor 314 of the media playback device 302.

In an aspect, the media playback device 302 can be configured to render different types of media streams from various content providers. The media server 304 can be communicably coupled to the data store 306, which can contain encrypted media content 310 that the media server 304 streams to the media content device 302 (e.g., the decoder component 102). As such, the encrypted media content 310 can be streamed to the media playback device 302 via the media server 304. Accordingly, the encrypted media content 310 streamed to the media playback device 302 can be processed by the decoder component 102. In an aspect, the encrypted media content 310 can be processed (e.g. played back) by the media playback device 302 in real time while being transmitted by the media server 304. In an another aspect, the encrypted media content 310 can be stored in the memory 312 of the media playback device 302, and subsequently processed by the decoder component 102. For example, the encrypted media content 310 can either be uploaded to memory 312 and/or downloaded to memory 312 from the media server 304. As such, the media playback device 302 can playback media content offline (e.g. locally on the media playback device 302 without a network connection to the media server 304). In an aspect, the license/key server 308 can provide a master key associated with the encrypted media content 310 to the media playback device 302.

Figure 4:
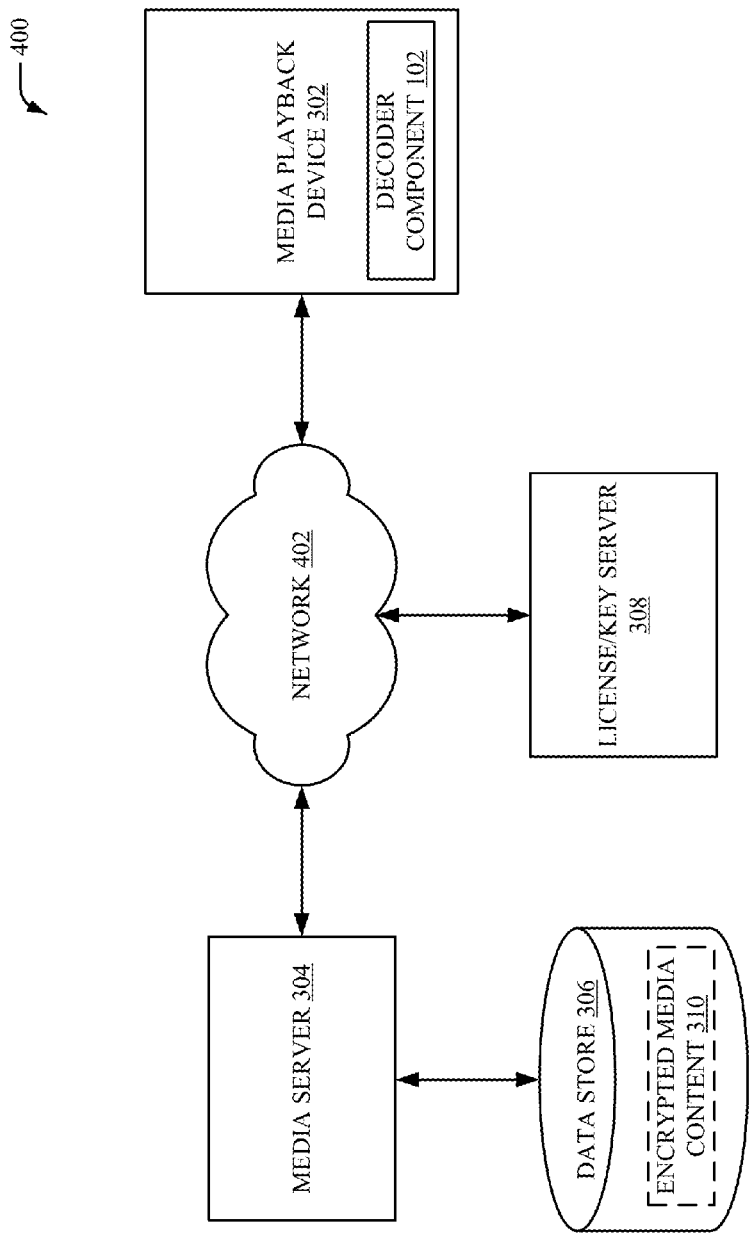
FIG. 4 illustrates a high-level block diagram of another example system to facilitate media content protection, in accordance with various aspects and implementations described herein.

FIG. 4 illustrates a non-limiting implementation of a system 400 in accordance with various aspects and implementations of this disclosure. The system 400 includes the media playback device 302, the media server 304, the data store 306 and the license/key server 308. The media playback device 302 includes at least the decoder component 102. In an aspect, the media server 304 and/or the data store 306 can be associated with a content provider. In another aspect, the license/key server 308 can be associated with a license/key provider. In yet another aspect, the media playback device 302 can be associated with a content consumer.

The media server 304 can be communicably coupled to the media playback device 302 via the network 402. The network 402 can include one or more networks. For example, network 402 can include one or more wired networks and/or one or more wireless networks, including but not limited to, a cellular network, a wide area network (WAN, e.g., the Internet), a local area network (LAN) and/or a personal area network (PAN). As such, the media playback device 302 can receive the encrypted media content 310 via virtually any desired wired or wireless technology, including, for example, cellular, WAN, wireless fidelity, etc.

The media server 304 and/or the data store 306 (e.g., a content provider) can provide one or more media streams (e.g., the encrypted media content 310) to the media playback device 302. In one embodiment, the network 402 includes the Internet and the media server 304 and/or the data store 306 provides content specified by an Internet site (e.g., a World Wide Web site). In another embodiment, the network 402 includes a LAN and the media server 304 is a LAN server or a storage device containing media files. In yet another embodiment, the media server 304 and/or the data store 306 is a database (e.g. a file system or a storage device) that is situated locally (e.g., with or on) the media playback device 302 and/or stores media content (e.g., media content downloaded from a Web site). In an aspect, the media playback device 302 can be communicably coupled to the license/key server 308 via the network 402. The license/key server 308 can contain or have access to decryption licenses and keys for decrypting encrypted media content (e.g., the master key) provided by a content provider.

Figure 5:
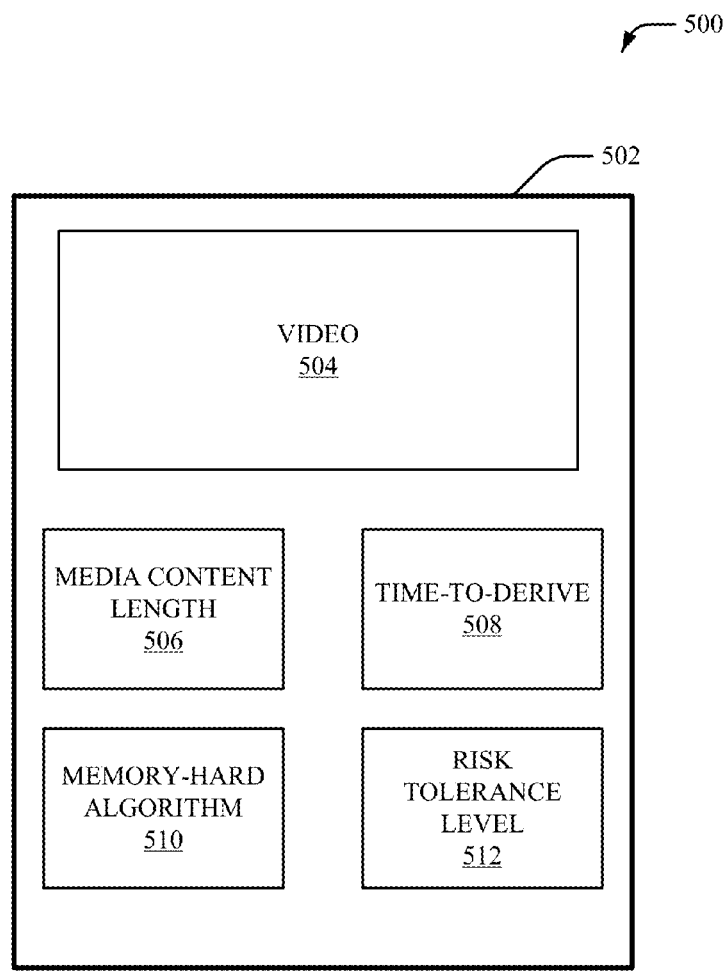
FIG. 5 illustrates a high-level block diagram of an example user interface to facilitate media content protection, in accordance with various aspects and implementations described herein.

FIG. 5 illustrates a non-limiting implementation of a system 500 in accordance with various aspects and implementations of this disclosure. The system 500 includes a device 502. In an aspect, the device 502 can include a graphical user interface to present a video 504, a media content length option 506, a time-to-derive option 508, a memory-hard algorithm option 510 and/or a risk tolerance level option 512. In an aspect, the device 502 can be associated with a content provider. The device 502 can include, but is not limited to, a cellular phone (e.g., a smart phone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc. The device 502 can generate and/or upload media content (e.g., a video 504). For example, the video 504 can be user-generated video content and/or user-uploaded video content that is generated and/or uploaded by the device 502. The device 502 can facilitate encryption of media content (e.g., encryption of the video 504). For example, the device 502 can allow a content provider to specify and/or select a risk tolerance level for media content (e.g., the video 504). The media content length option 506 can present and/or display media content length (e.g., length of the video 504).

In an aspect, the device 502 can allow a content provider to specify and/or select a time-to-derive value (e.g., a time-to duplicate value) associated with the video 504. For example, a content provider can specify and/or select how quickly to allow the video 504 to be accessed by a consumer. A lowest time-to-derive value can correspond to time associated with network overhead for duplicating the video 504. A highest time-to-derive value can correspond to time for the video 504 to playback fully (e.g., a time value presented and/or displayed by the media content length option 506). In an aspect, the device 502 can allow a content provider to specify and/or select a memory-hard algorithm via a memory-hard algorithm option 510. For example, the memory-hard algorithm option 510 can include one or more memory-hard algorithms (e.g., for processing the video 504) that can be selected by a content provider. As such, the risk tolerance level option 512 can generate a risk tolerance level (e.g., a risk profile) based on the media content length option 506, the time-to-derive option 508 and/or the memory-hard algorithm option 510. In an aspect, a content provider can specify and/or select a risk tolerance level via the risk tolerance level option 512. As such, a time-to-derive value and/or a memory-hard algorithm can be automatically generated and/or selected based on a risk tolerance level specified and/or selected via the risk tolerance level option 512. Accordingly, one or more parameters associated with one or more memory operation (e.g., one or more memory-hard algorithm parameters) can be generated based on the media content length option 506, the time-to-derive option 508, the memory-hard algorithm option 510 and/or the risk tolerance level option 512.

Figure 6:
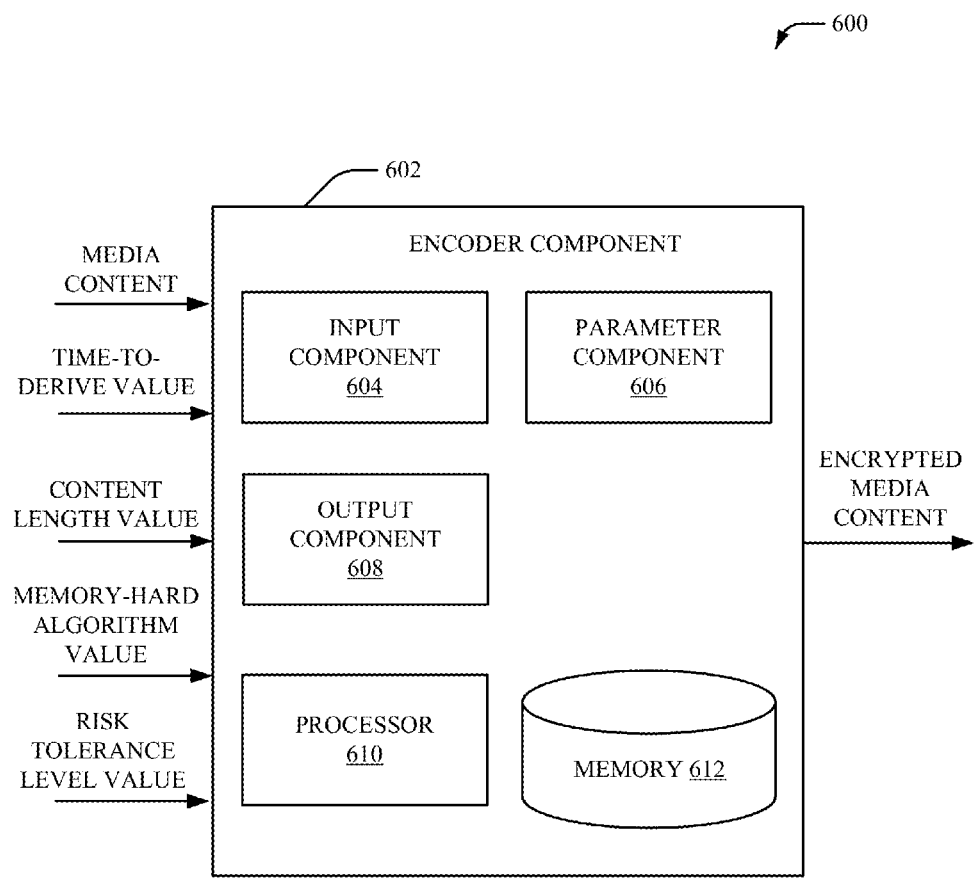
FIG. 6 illustrates a high-level block diagram of an example system for encrypting media content, in accordance with various aspects and implementations described herein.

Referring to FIG. 6, there is illustrated an example system 600 that can for encrypting media content, according to an aspect of the subject disclosure. In an aspect, the system 600 can be implemented on or in connection with one or more servers (e.g., one or more servers that host user-uploaded media content). For example, the system 600 can be employed by various systems, such as, but not limited to media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, and the like. In another aspect, the system 600 can be implemented on or in connection with a device (e.g., a user device). For example, the device (e.g., the user device) can include, but is not limited to, a cellular phone (e.g., a smart phone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc.

Specifically, the system 600 can provide an encoder component with an input feature (e.g., input component 604), a parameter feature (e.g., parameter component 606) and an output feature (e.g., output component 608) that can be utilized in, for example, a media content application (e.g., a video application). The input feature can receive one or more values associated with content protection for media content. The parameter feature can generate one or more parameters associated with one or more memory operations based on the one or more values associated with the content protection for the media content. The output feature can generate encrypted media content that includes the one or more parameters associated with the one or more memory operations.

In particular, the system 600 can include an encoder component 602 that includes at least an input component 604, a parameter component 606 and an output component 608. Aspects of the systems, apparatuses or processes explained in this disclosure can constitute machine-executable component(s) embodied within machine(s), e.g., embodied in one or more computer readable mediums (or media) associated with one or more machines. Such component, when executed by the one or more machines, e.g., computer(s), computing device(s), virtual machine(s), etc. can cause the machine(s) to perform the operations described. System 600 can include memory 612 for storing computer executable components and instructions. System 600 can further include a processor 610 to facilitate operation of the instructions (e.g., computer executable components and instructions) by system 600.

The encoder component 602 (e.g., the input component 604) can receive media content (e.g., MEDIA CONTENT shown in FIG. 6). Additionally, the encoder component 602 (e.g., the input component 604) can receive one or more values associated with content protection for the media content. For example, the encoder component 602 (e.g., the input component 604) can additionally receive a time-to-derive value (e.g., TIME-TO-DERIVE VALUE shown in FIG. 6), a content length value (e.g., CONTENT LENGTH VALUE shown in FIG. 6), a memory-hard algorithm value (e.g., MEMORY-HARD ALGORITHM VALUE shown in FIG. 6) and/or a risk tolerance level value (e.g., RISK TOLERANCE LEVEL VALUE shown in FIG. 6). The content length value can be a time value associated with the media content. For example, the content length value can correspond to a time value associated with the media content.

The time-to-derive value can correspond to a computational time value associated with processing (e.g., decrypting) at least a portion of the media content. In one example, the time-to-derive value can correspond to a computational time value associated with processing (e.g., decrypting) a single media content segment associated with the media content. In another example, the time-to-derive value can correspond to a computational time value associated with processing (e.g., decrypting) the entire media content. The memory-hard algorithm value can correspond to a value associated with a particular memory-hard algorithm that can be employed to process (e.g., decode) the media content. The risk tolerance level value can correspond to a risk value associated with strength of content protection associated with the media content. The time-to-derive value, the memory-hard algorithm value and/or the risk tolerance level value can be specified, selected and/or generated by a content provider (e.g., a content provider associated with a device 502). In an aspect, the time-to-derive value, the memory-hard algorithm value and/or the risk tolerance level value can be received in a single input signal. In another aspect, the time-to-derive value, the memory-hard algorithm value and/or the risk tolerance level value can be received via a plurality of input signals.

The media content (e.g., a media file) can include but is not limited to a video (e.g., a video file, a video clip, a video sample, etc.), an image (e.g., an image file, a picture, a thumbnail, etc.), music (e.g., an audio file, an audio clip, an audio sample, etc.), an electronic book (e-book), a video game and/or user-generated content. In one example, the media content can be uploaded by a user (e.g., a user of a media sharing platform). For example, a user can upload the media content via a smart phone, a cell phone, a tablet, a laptop, a desktop computer, a personal digital assistant (PDA), a portable music player, a video game system, an electronic reader (e-reader), global positioning system (GPS), a set-top box, a television, etc.

The parameter component 606 can generate one or more parameters associated with one or more memory operations. For example, the parameter component 606 can generate one or more parameters associated with one or more memory operations (e.g., one or more memory-hard algorithm parameters) based on the time-to-derive value, the content length value, the memory-hard algorithm value and/or the risk tolerance level value. The one or more parameters associated with one or more memory operations can include, but is not limited to, an amount of memory to utilize (e.g., a percentage of a memory capacity to utilize), number of steps to perform (e.g., number of steps associated with a memory-hard algorithm to perform) and/or a different type of parameter associated with a memory-hard algorithm and/or a memory associated with a media playback device.

The output component 608 can generate encrypted media content (e.g., ENCRYPTED MEDIA CONTENT shown in FIG. 6) that is associated with and/or includes the one or more parameters associated with the one or more memory operations. In an aspect, the one or more parameters associated with the one or more memory operations can be transmitted in a data stream of the encrypted media content. In one example, the one or more parameters associated with the one or more memory operations can be included in (e.g., encapsulated in) metadata of the encrypted media content. In another example, the one or more parameters associated with the one or more memory operations can be included in (e.g., encapsulated in) a header of the encrypted media content. In another aspect, the one or more parameters associated with the one or more memory operations can be transmitted in a data stream that is different than a data stream of the encrypted media content. In yet another aspect, the encrypted media content generated by the output component 608 can be stored in a data store (e.g., data store 306) and/or received by a decoder component (e.g., decoder component 102).

While FIG. 6 depicts separate components in system 600, it is to be appreciated that the components may be implemented in a common component. For example, the input component 604, the parameter component 606 and/or the output component 608 can be included in a single component. Further, it can be appreciated that the design of system 600 can include other component selections, component placements, etc., to facilitate encryption of media content.

Figure 7:
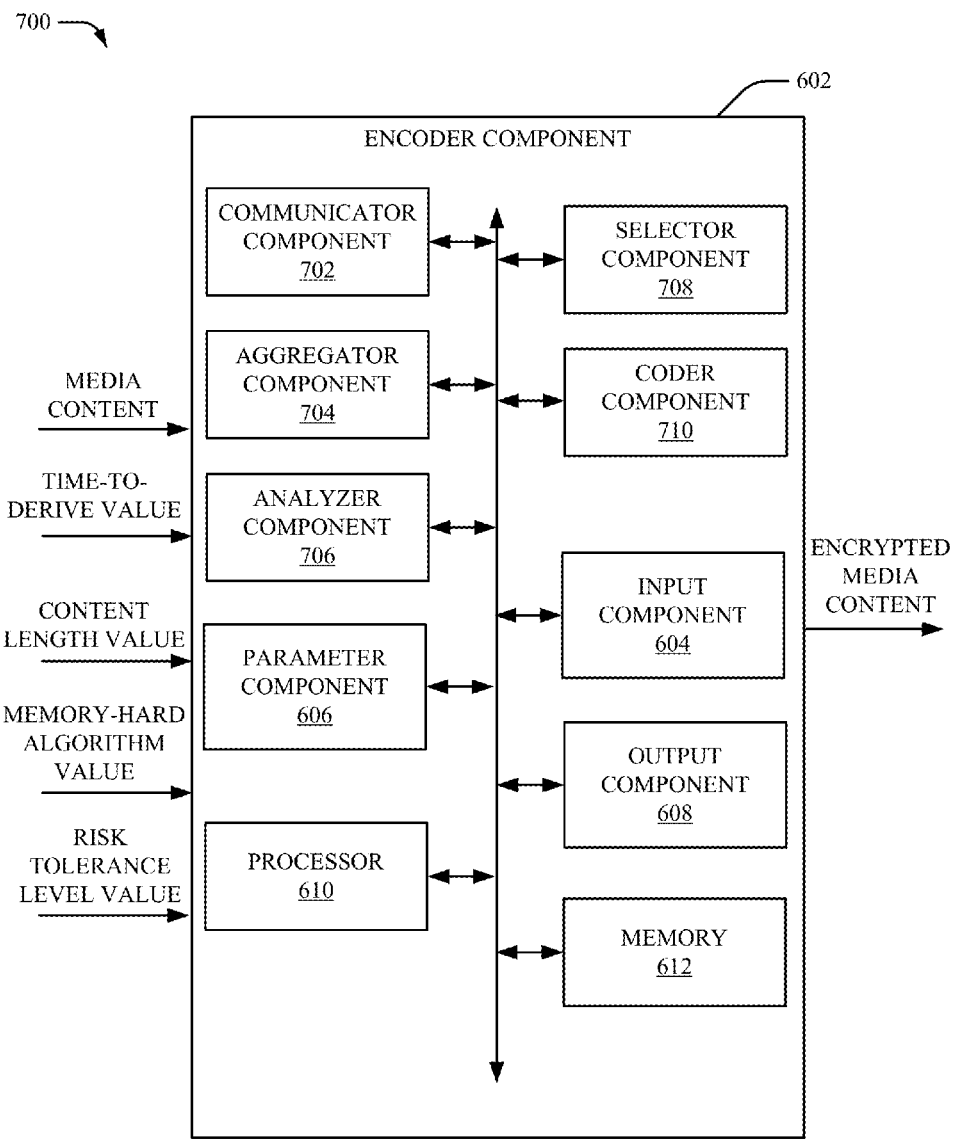
FIG. 7 illustrates a high-level block diagram of another example system for encrypting media content, in accordance with various aspects and implementations described herein.

Referring now to FIG. 7, there is illustrated a non-limiting implementation of a system 700 in accordance with various aspects and implementations of this disclosure. The system 700 can include the encoder component 602. The encoder component 602 can include the input component 604, the parameter component 606, the output component 608, a communicator component 702, an aggregator component 704, an analyzer component 706, a selector component 708 and/or a coder component 710.

The communicator component 702 can be used to communicate (e.g., transmit, receive, etc.) information between the encoder component 602 and other components (e.g., a decoder component, one or more servers, a user interface, a media source, a media capture device, a data store, a computer-readable storage media, etc.). The information can include, for example, raw video frames of a video frame sequence, information that can facilitate encoding data associated with raw video frames, information relating to defined encoding criterion or corresponding rules, information relating to encoding parameters, encoding algorithms, etc., that can be used by the encoder component 602 to facilitate enabling the encoder component 602 to encode data. The communicator component 702 also can transmit encoded video frames (e.g., an encoded video bitstream, encrypted media content, etc.) to, for example, a data store, or computer-readable storage media.

The aggregator component 704 can aggregate data received (e.g., obtained) from various entities (e.g., media source, media capture device, processor, data store, user interface, etc.). The aggregator component 704 can correlate respective items of data based at least in part on type of data, source of the data, time or date the data was generated or received, encoding state of the data, a video frame or coding unit to which the data relates, etc., to facilitate analyzing of the data by the analyzer component 706.

The analyzer component 706 can analyze data to facilitate encoding data, ordering of prior encoded blocks of current and/or previous frames in relation to encoding a current block, identifying a coding mode, allocating bits to blocks for encoding of raw video frames, etc., and can generate analysis results, based at least in part on the data analysis. The encoder component 602 can use the analysis results to facilitate enabling the coder component 710 to efficiently encode raw video frames of a video frame sequence.

The selector component 708 that can select items of data, an applicable encoding-related algorithm (e.g., compression algorithm, ordering algorithm to order prior encoded blocks, algorithm relating to identifying or selecting a coding mode, etc.), a block or motion vector, encoding-related parameter values, a coding mode, or other information, to facilitate encoding data, etc. For example, the selector component 708 can select one or more parameters, one or more items of data, etc., relevant to an encoding task (e.g., ordering of prior encoded motion vectors, identifying a coding mode, etc.) being performed by the encoder component 602.

The coder component 710 can encode or compress data associated with a video frame in accordance with a defined encoding or compression algorithm. In some implementations, the coder component 710 can use a specified quantization value that can correspond to the compression level to be used during the encoding of a block (or associated motion vector) of a raw video frame.

In some implementations, the encoder component 602 also can include the processor 610 that can operate with the other components (e.g., input component 604, parameter component 606, output component 608, communicator component 702, aggregator component 704, analyzer component 706, etc.) to facilitate performing the various functions of the encoder component 602. In an aspect, the processor 610 can employ one or more processors, microprocessors, or controllers that can process data, such as information relating to encoding data, information relating to other operations of the encoder component 602, and/or other information, etc., to facilitate encoding video content and/or performing other operations associated with the encoder component 602, as more fully disclosed herein. In another aspect, the processor 610 can control data flow between the encoder component 602 and other components (e.g., media source, media capture device, data store, computer-readable storage media, etc.) associated with the encoder component 602.

In some implementations, the memory 612 can store data structures (e.g., user data, video content, metadata), instructions, procedures, and/or code structure(s) (e.g., modules, objects, hashes, classes) to facilitate performing or controlling operations associated with the encoder component 602. In an aspect, the memory 612 also can store information (e.g., encoding-related algorithms, coding modes, encoding parameters, encoding criterion, etc.) relating to encoding data, and/or information relating to other operations of the encoder component 602, etc., to facilitate encoding video content, and performing or controlling operations, associated with the encoder component 602. The processor 610 can be coupled (e.g., through a memory bus) to the memory 612 in order to store and retrieve information desired to operate and/or confer functionality, at least in part, to the components (e.g., input component 604, parameter component 606, output component 608, communicator component 702, aggregator component 704, analyzer component 706, etc.) of the encoder component 602, and/or substantially any other operational aspects of the encoder component 602.

Figure 8:
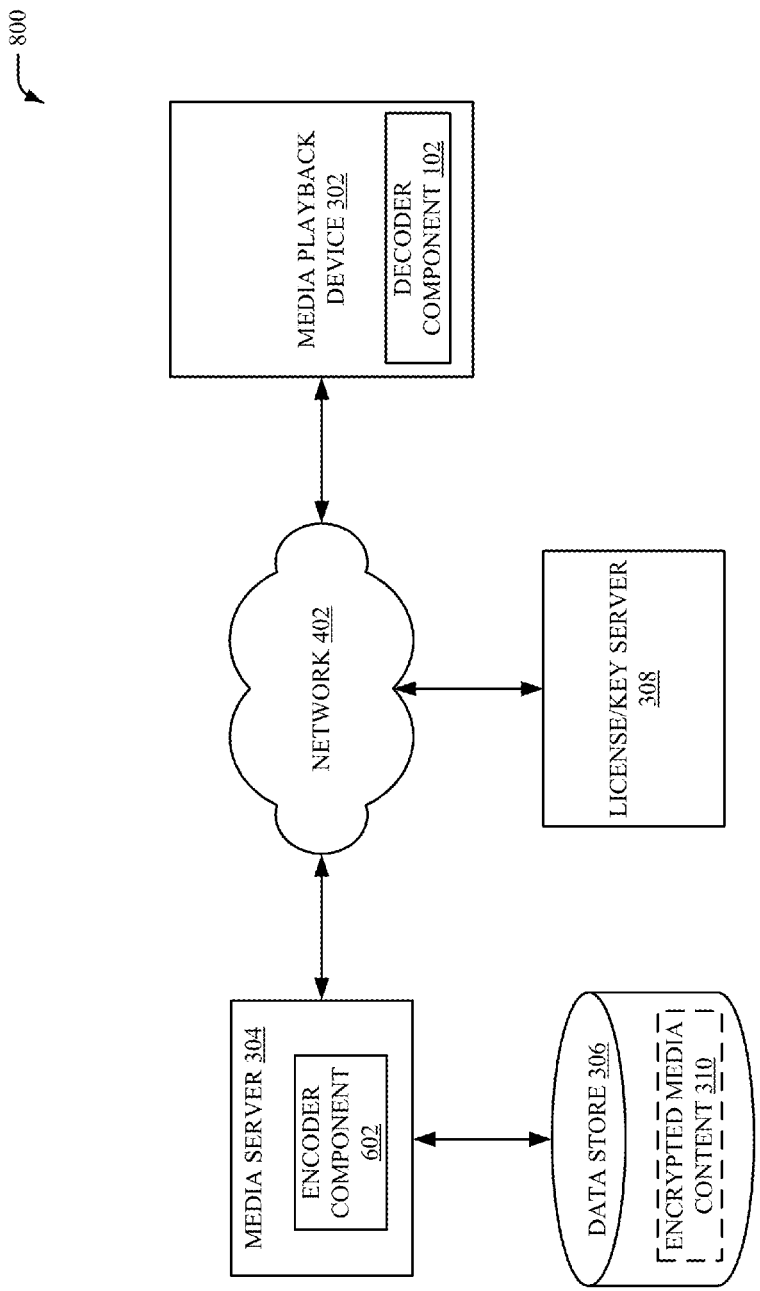
FIG. 8 illustrates a high-level block diagram of yet another example system to facilitate media content protection, in accordance with various aspects and implementations described herein.

FIG. 8 illustrates a non-limiting implementation of a system 800 in accordance with various aspects and implementations of this disclosure. The system 800 includes the media playback device 302, the media server 304, the data store 306 the license/key server 308 and the network 402. In an aspect, the media server can include and/or be associated with the encoder component 602. In another aspect, the encoder component 602 can generate the encrypted media content 310 that is stored in the data store 306 and/or transmitted to the media playback device 302 (e.g., the decoder component 102). As such, the encoder component 602 can be associated with a content provider and the decoder component 102 can be associated with a content consumer (e.g., a media playback device 302, a web browser associated with the media playback device 302, etc.).

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 9-12 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or storage media.

Figure 9:
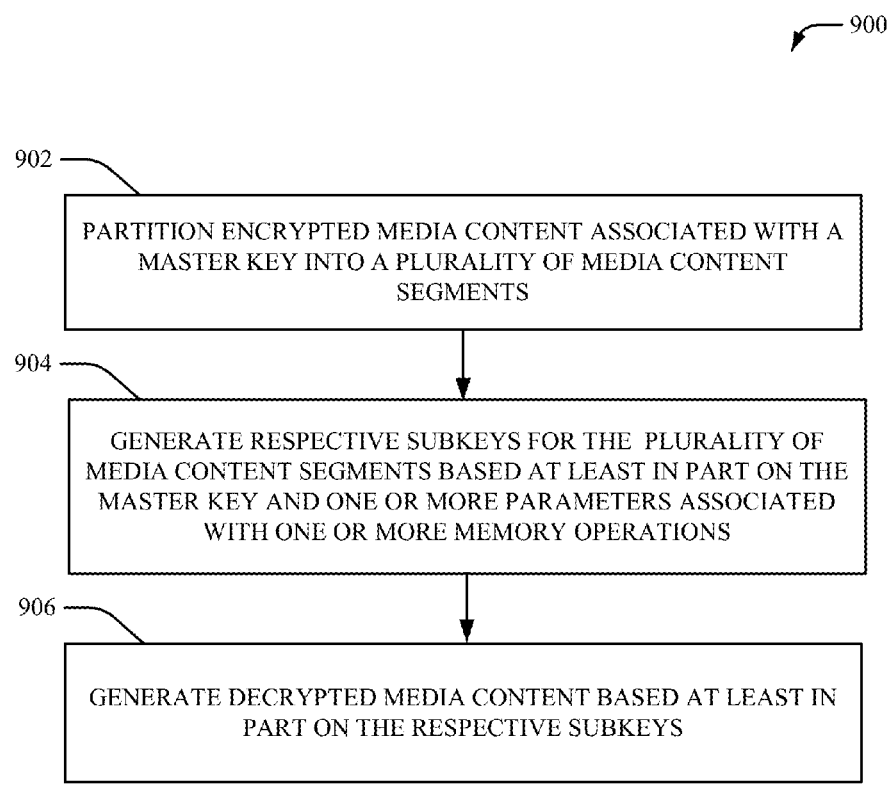
FIG. 9 depicts a flow diagram of an example method for decrypting media content, in accordance with various aspects and implementations described herein.

Referring to FIG. 9, there illustrated is a methodology 900 for decrypting media content, according to an aspect of the subject innovation. As an example, methodology 900 can be utilized in connection with a device (e.g., a user device) such as, but is not limited to, a cellular phone (e.g., a smartphone), a tablet, a camera, a personal computer (PC), a desktop computer, a laptop computer, a personal digital assistant (PDA), an electronic reader (e-reader), a media capable device, a portable computing device, an interactive television, an internet-connected television, a set-top box, a streaming media device, a gaming device, etc. As another example, the methodology can be implemented on or in connection with one or more servers (e.g., one or more servers that host user-uploaded media content). For example, the methodology 900 can be utilized in various applications, such as, but not limited to, media content systems, media server systems, cloud-based systems, content management systems, network systems, computer network systems, communication systems, router systems, server systems, high availability server systems (e.g., Telecom server systems), Web server systems, file server systems, disk array systems, powered insertion board systems, etc.

At 902, encrypted media content associated with a master key is partitioned into a plurality of media content segments (e.g., by a partitioning component 104). In an aspect, the encrypted media content can be encrypted streaming media content. In another aspect, the encrypted media content associated with the master key can be partitioned into a plurality of media content segments based on a particular interval of time associated with the encrypted media content. In yet another aspect, the encrypted media content associated with the master key can be partitioned into a plurality of media content segments based on a characteristic associated with the encrypted media content (e.g., number of media frames, format of the encrypted media content, codec compression format, etc.).

At 904, respective subkeys for the plurality of media content segments are generated (e.g., by a key derivation component 106) based at least in part on the master key and one or more parameters associated with one or more memory operations. For example, a first subkey can be generated for a first media content segment based at least in part on the master key and one or more parameters associated with one or more memory operations, a second subkey can be generated for a second media content segment based at least in part on the master key and one or more parameters associated with one or more memory operations, etc. The one or more parameters associated with one or more memory operations can be one or more memory-hard algorithm parameters. A memory operation can include an active memory operation (e.g., a read, a write, etc.) associated with decrypting the encrypted media content. In an aspect, the respective subkeys for the plurality of media content segments can be generated based at least in part on timed metadata (e.g., an offset value). In an embodiment, a subkey for a media content segment can be generated based on data included in a previous media content segment. In another embodiment, a subkey for a media content segment can be generated based on a previously generated subkey (e.g., a subkey generated for a previous media content segment).

At 906, decrypted media content is generated (e.g., by an output component 108) based at least in part on the respective subkeys. In an aspect, the decrypted media content can be generated based at least in part on a symmetric cryptographic operation. In another aspect, the decrypted media content can be further processed based at least in part on a different symmetric cryptographic operation (e.g., more than one type of decryption process can be implemented to generate decrypted media content). In yet another aspect, the decrypted media content can be generated based at least in part on a memory-bounded decryption operation.

Figure 10:
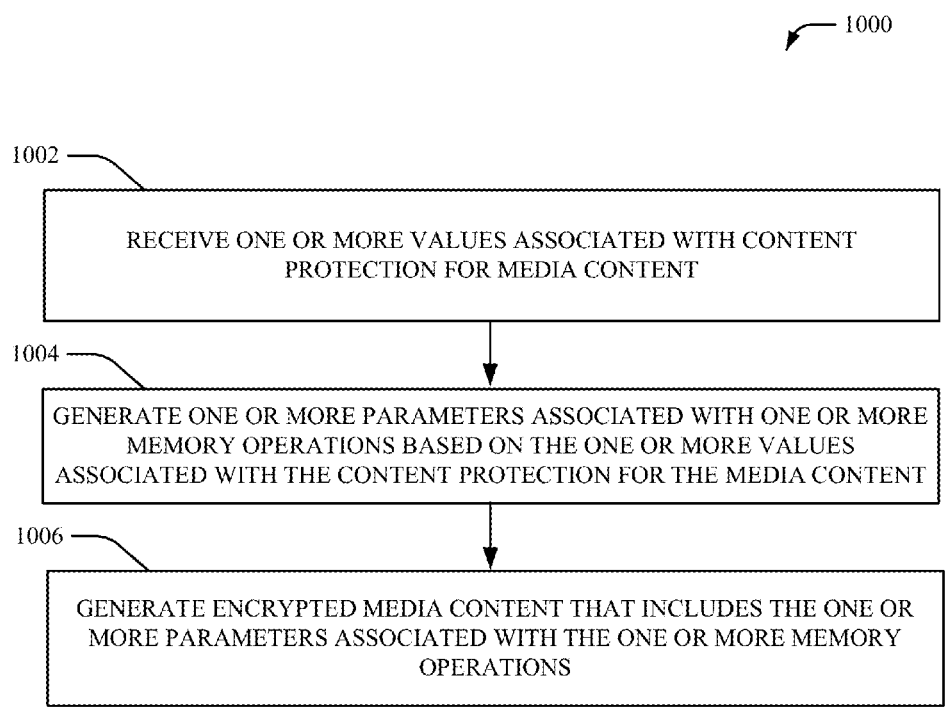
FIG. 10 depicts a flow diagram of an example method for encrypting media content, in accordance with various aspects and implementations described herein.

Referring to FIG. 10, there illustrated is an example methodology 1000 for encrypting media content, according to an aspect of the subject innovation. In an aspect, methodology 1000 can be implemented in connection with methodology 900 (e.g., to generate encrypted media content). At 1002, one or more values associated with content protection for media content are received (e.g., by an input component 604). For example, the one or more values associated with content protection can include, but is not limited to, a time-to-derive value (e.g., a computational time value associated with decrypting at least a portion of the media content), a content length value (e.g., a time value associated with the media content), a memory-hard algorithm value (e.g., a value associated with a particular memory-hard algorithm that can be employed to decode the media content) and/or a risk tolerance level value (e.g., a risk value associated with strength of content protection associated with the media content). In an aspect, the time-to-derive value, the memory-hard algorithm value and/or the risk tolerance level value can be specified, selected and/or generated by a content provider.

At 1004, one or more parameters associated with one or more memory operations are generated (e.g., by a parameter component 606) based on the one or more values associated with the content protection for the media content. For example, one or more memory-hard algorithm parameters can be generated based on the time-to-derive value, the content length value, the memory-hard algorithm value and/or the risk tolerance level value.

At 1006, encrypted media content that includes the one or more parameters associated with the one or more memory operations is generated (e.g., by an output component 608). In an aspect, the one or more parameters associated with the one or more memory operations can be transmitted in a data stream of the encrypted media content. In one example, the one or more parameters associated with the one or more memory operations can be included in (e.g., encapsulated in) metadata of the encrypted media content. In another example, the one or more parameters associated with the one or more memory operations can be included in (e.g., encapsulated in) a header of the encrypted media content. In another aspect, the one or more parameters associated with the one or more memory operations can be transmitted in a data stream that is different than a data stream of the encrypted media content.

Figure 11:
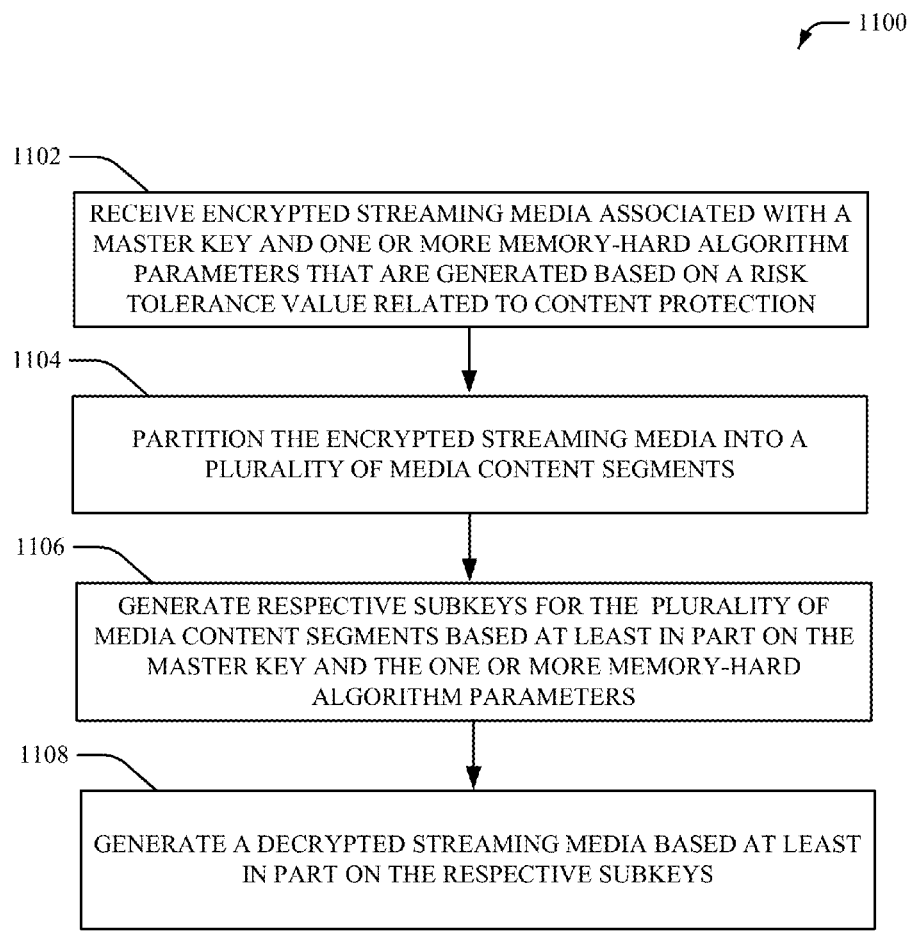
FIG. 11 depicts a flow diagram of another example method for decrypting media content, in accordance with various aspects and implementations described herein.

Referring to FIG. 11, there illustrated is an example methodology 1100 for decrypting media content, according to another aspect of the subject innovation. At 1102, encrypted streaming media associated with a master key and one or more memory-hard algorithm parameters that are generated based on a risk tolerance value related to content protection is received (e.g., by a partitioning component 104). For example, one or more parameters associated with a memory-hard algorithm employed to process the encrypted streaming media can be received.

At 1104, the encrypted streaming media is partitioned (e.g., by a partitioning component 104) into a plurality of media content segments. For example, the encrypted streaming media can be partitioned into a plurality of media content segments based on a particular interval of time. In another example, the encrypted streaming media can be partitioned into a plurality of media content segments based on a characteristic associated with the encrypted streaming media (e.g., number of media frames, format of the encrypted streaming media, codec compression format, etc.).

At 1106, respective subkeys for the plurality of media content segments is generated (e.g., by a key derivation component 106) based at least in part on the master key and the one or more memory-hard algorithm parameters. For example, a memory-hard key derivation algorithm associated with the one or more memory-hard algorithm parameters can be employed to generate respective subkeys for the plurality of media content segments based at least in part on the master key and the one or more memory-hard algorithm parameters.

At 1108, decrypted streaming media is generated (e.g., by an output component 108) based at least in part on the respective subkeys. For example, the respective subkeys can be employed to decrypt the encrypted streaming media via one or more types of key decryption operations.

Figure 12:
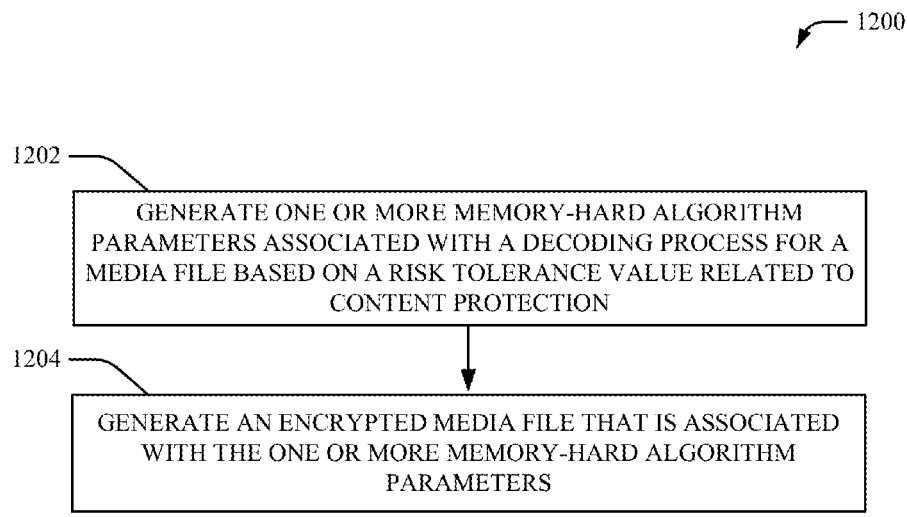
FIG. 12 depicts a flow diagram of another example method for encrypting media content, in accordance with various aspects and implementations described herein.

Referring to FIG. 12, there illustrated is an example methodology 1200 for encrypting media content, according to another aspect of the subject innovation. In an aspect, methodology 1200 can be implemented in connection with methodology 1100 (e.g., to generate encrypted streaming media). At 1202, one or more memory-hard algorithm parameters associated with a decoding process for a media file is generated (e.g., by a parameter component 606) based on a risk tolerance value related to content protection. For example, one or more memory-hard algorithm parameters associated with a decoding process for a media file can be generated based on a risk tolerance value associated with a computation time to derive a decrypted version of at least a portion of the encrypted media file.

At 1204, an encrypted media file that is associated with the one or more memory-hard algorithm parameters is generated (e.g., by an output component 608). For example, one or more memory-hard algorithm parameters that can be employed during a decoding process to decode the encrypted media file can be generated and/or associated with the encrypted media file.

Figure 13:
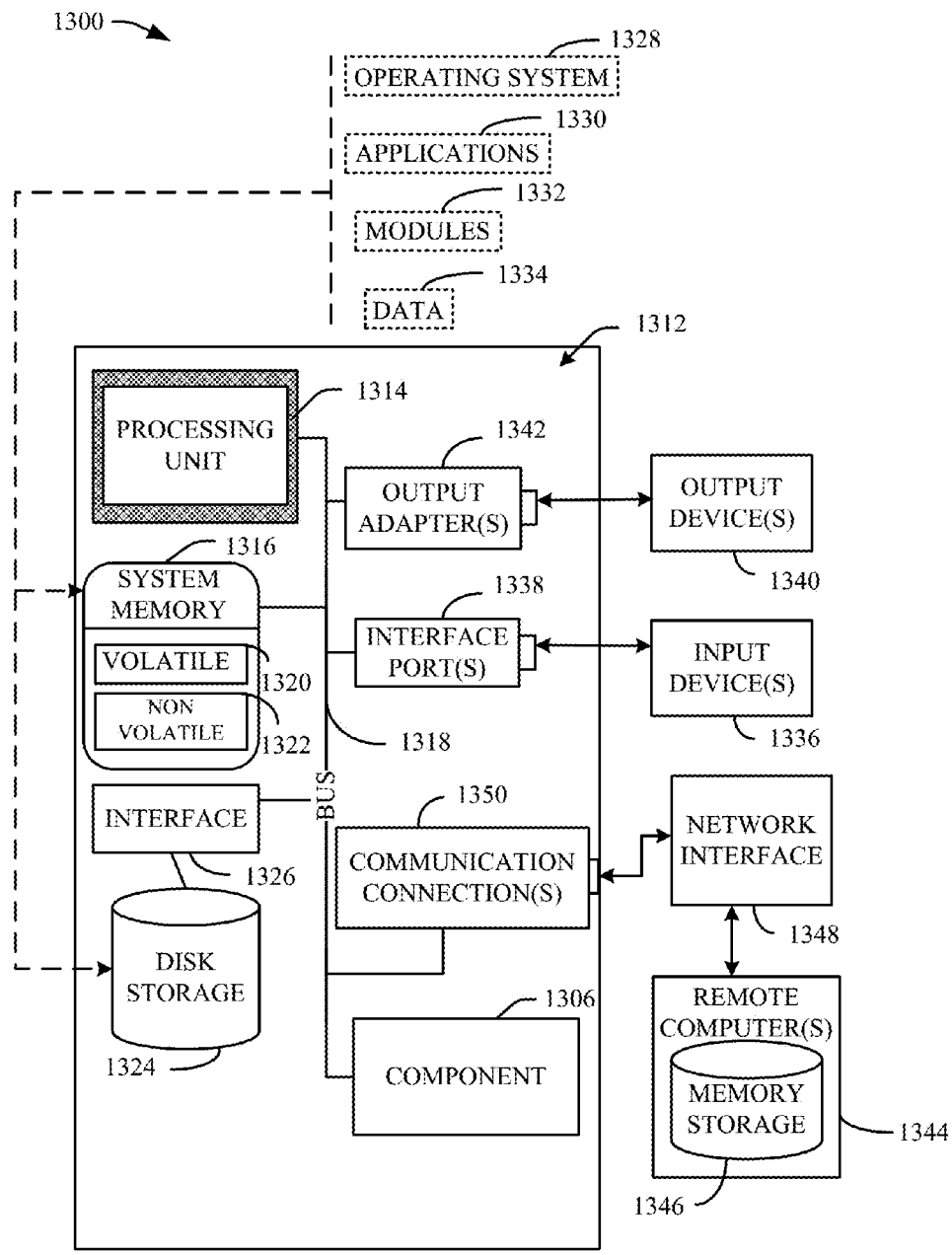
FIG. 13 is a schematic block diagram illustrating a suitable operating environment.
Figure 14:
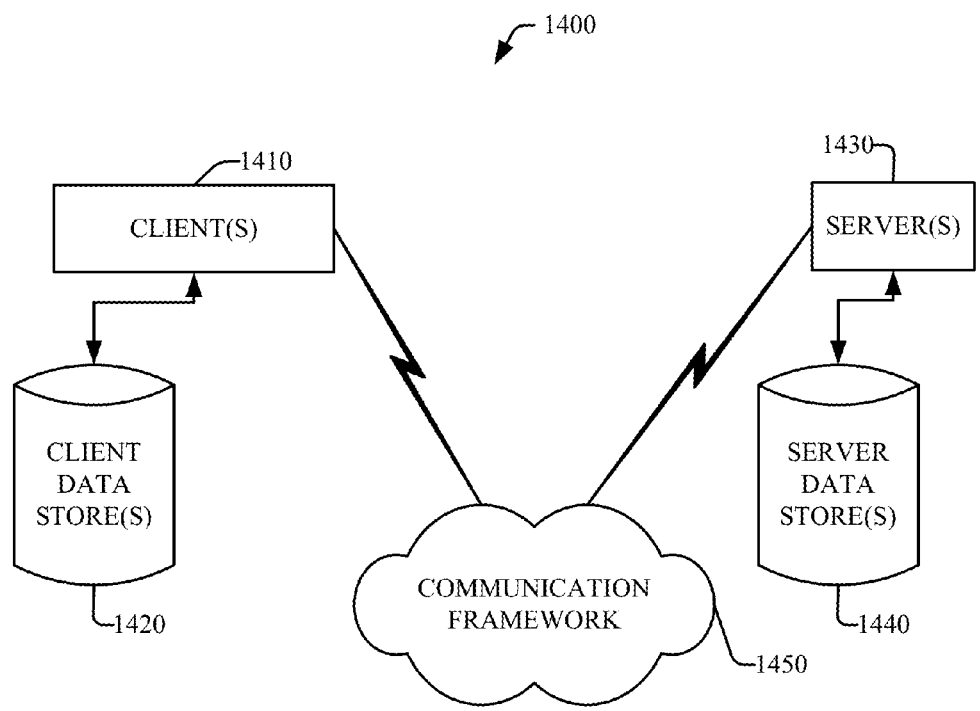
FIG. 14 is a schematic block diagram of a sample-computing environment.

In order to provide a context for the various aspects of the disclosed subject matter, FIGS. 13 and 14 as well as the following discussion are intended to provide a brief, general description of a suitable environment in which the various aspects of the disclosed subject matter may be implemented.

With reference to FIG. 13, a suitable environment 1300 for implementing various aspects of this disclosure includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1320 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 also includes removable/non-removable, volatile/non-volatile computer storage media. FIG. 13 illustrates, for example, a disk storage 1324. Disk storage 1324 includes, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1324 to the system bus 1318, a removable or non-removable interface is typically used, such as interface 1326.

FIG. 13 also depicts software that acts as an intermediary between users and the basic computer resources described in the suitable operating environment 1300. Such software includes, for example, an operating system 1328. Operating system 1328, which can be stored on disk storage 1324, acts to control and allocate resources of the computer system 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a router, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

It is to be appreciated that the computer 1312 can be used in connection with implementing one or more of the systems or components shown and described in connection with FIGS. 1-8. In accordance with various aspects and implementations, the computer 1312 can be used to facilitate media content protection. In certain exemplary embodiments, the computer 1312 includes a component 1306 (e.g., decoder component 102 and/or encoder component 602) that can contain, for example, a partitioning component, a key derivation component, an output component, an input component, a parameter component, a communicator component, an aggregator component, an analyzer component, a selector component, a decompression component and/or a coder component, each of which can respectively function as more fully disclosed herein.

FIG. 14 is a schematic block diagram of a sample-computing environment 1400 with which the subject matter of this disclosure can interact. The system 1400 includes one or more client(s) 1410. The client(s) 1410 can be hardware and/or software (e.g., threads, processes, computing devices). The system 1400 also includes one or more server(s) 1430. Thus, system 1400 can correspond to a two-tier client server model or a multi-tier model (e.g., client, middle tier server, data server), amongst other models. The server(s) 1430 can also be hardware and/or software (e.g., threads, processes, computing devices). The servers 1430 can house threads to perform transformations by employing this disclosure, for example. One possible communication between a client 1410 and a server 1430 may be in the form of a data packet transmitted between two or more computer processes.

The system 1400 includes a communication framework 1450 that can be employed to facilitate communications between the client(s) 1410 and the server(s) 1430. The client(s) 1410 are operatively connected to one or more client data store(s) 1420 that can be employed to store information local to the client(s) 1410. Similarly, the server(s) 1430 are operatively connected to one or more server data store(s) 1440 that can be employed to store information local to the servers 1430.

It is to be noted that aspects or features of this disclosure can be exploited in substantially any wireless telecommunication or radio technology, e.g., Wi-Fi; Bluetooth; Worldwide Interoperability for Microwave Access (WiMAX); Enhanced General Packet Radio Service (Enhanced GPRS); Third Generation Partnership Project (3GPP) Long Term Evolution (LTE); Third Generation Partnership Project 2

(3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); GSM (Global System for Mobile Communications) EDGE (Enhanced Data Rates for GSM Evolution) Radio Access Network (GERAN); UMTS Terrestrial Radio Access Network (UTRAN); LTE Advanced (LTE-A); etc. Additionally, some or all of the aspects described herein can be exploited in legacy telecommunication technologies, e.g., GSM. In addition, mobile as well non-mobile networks (e.g., the Internet, data service network such as internet protocol television (IPTV), etc.) can exploit aspects or features described herein.

While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone), microprocessor-based or programmable consumer or industrial electronics, and the like. The illustrated aspects may also be practiced in distributed computing environments where tasks are performed by remote processing devices that are linked through a communications network. However, some, if not all aspects of this disclosure can be practiced on stand-alone computers. In a distributed computing environment, program modules may be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Various aspects or features described herein can be implemented as a method, apparatus, system, or article of manufacture using standard programming or engineering techniques. In addition, various aspects or features disclosed in this disclosure can be realized through program modules that implement at least one or more of the methods disclosed herein, the program modules being stored in a memory and executed by at least a processor. Other combinations of hardware and software or hardware and firmware can enable or implement aspects described herein, including a disclosed method(s). The term "article of manufacture" as used herein can encompass a computer program accessible from any computer-readable device, carrier, or storage media. For example, computer readable storage media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ), or the like.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or methods herein are intended to include, without being limited to including, these and any other suitable types of memory.

It is to be appreciated and understood that components (e.g., decoder component, encoder component, partitioning component, key derivation component, output component, input component, parameter component, communicator component, aggregator component, analyzer component, selector component, decompression component, coder component, etc.), as described with regard to a particular system or method, can include the same or similar functionality as respective components (e.g., respectively named components or similarly named components) as described with regard to other systems or methods disclosed herein.

What has been described above includes examples of systems and methods that provide advantages of this disclosure. It is, of course, not possible to describe every conceivable combination of components or methods for purposes of describing this disclosure, but one of ordinary skill in the art may recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory storing computer executable components; and
a processor configured to execute the following computer executable components stored in the memory:
a partitioning component that partitions encrypted media content associated with a master key into a plurality of media content segments;
a key derivation component that generates respective subkeys for the plurality of media content segments based at least in part on the master key and one or more parameters associated with one or more memory operations, wherein the one or more parameters are generated based on a computation time to generate a copy of a portion of the encrypted media content; and
an output component that generates decrypted media content based at least in part on the respective subkeys.

2. The system of claim 1, wherein the master key is embedded in the encrypted media content with timed metadata.

3. The system of claim 2, wherein the key derivation component further generates the respective subkeys for the plurality of media content segments based at least in part on the timed metadata.

4. The system of claim 1, wherein the one or more parameters are generated based on a total playback time of the encrypted media content.

5. The system of claim 1, wherein the output component generates the decrypted media content based at least in part on symmetric key decryption.

6. The system of claim 5, wherein the decrypted media content is further processed based at least in part on a different type of symmetric key decryption.

7. The system of claim 1, wherein the output component generates the decrypted media content based at least in part on memory-bounded decryption.

8. The system of claim 1, wherein the key derivation component generates a subkey for a particular media content segment from the plurality of media content segments based on data associated with a previous media content segment from the plurality of media content segments.

9. A method, comprising:
partitioning, by a system including a processor, encrypted media content associated with a master key into a plurality of media content segments;
generating, by the system, respective subkeys for the plurality of media content segments based at least in part on the master key and one or more parameters associated with one or more memory operations, wherein the one or more parameters are generated based on a computation time to generate a copy of a portion of the encrypted media content; and
generating, by the system, decrypted media content based at least in part on the respective subkeys.

10. The method of claim 9, wherein the master key is embedded in the encrypted media content with timed metadata.

11. The method of claim 9, wherein the generating the respective subkeys further includes generating the respective subkeys for the plurality of media content segments based at least in part on timed metadata associated with the master key.

12. The method of claim 9, further comprising generating the one or more parameters based on a total playback time of the encrypted media content.

13. The method of claim 9, wherein the generating the decrypted media content includes generating the decrypted media content based at least in part on symmetric key decryption.

14. The method of claim 13, further comprising processing the decrypted media content based at least in part on a different type of symmetric key decryption.

15. The method of claim 9, wherein the generating the decrypted media content includes generating the decrypted media content based at least in part on memory-bounded decryption.

16. The method of claim 9, wherein the generating the decrypted media content includes generating a subkey for a particular media content segment from the plurality of media content segments based on data associated with a previous media content segment from the plurality of media content segments.

17. A method, comprising:
   generating, by a system, one or more parameters associated with one or more memory operations based on one or more values associated with content protection for a media content, wherein the one or more values include a total playback time of the encrypted media content and a computation time to generate a copy of the encrypted media content; and
   generating, by the system, encrypted media content that includes the one or more parameters associated with the one or more memory operations.

* * * * *